(12) United States Patent
Barrass

(10) Patent No.: US 7,545,055 B2
(45) Date of Patent: *Jun. 9, 2009

(54) MULTI-PAIR AGGREGATE POWER DISTRIBUTION

(75) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/390,802

(22) Filed: Mar. 27, 2006

(65) Prior Publication Data

US 2006/0163949 A1 Jul. 27, 2006

Related U.S. Application Data

(63) Continuation of application No. 10/287,886, filed on Nov. 4, 2002, now Pat. No. 7,053,501.

(51) Int. Cl.
*H02J 3/38* (2006.01)
*H01B 11/02* (2006.01)

(52) U.S. Cl. .................... 307/62; 307/19; 307/29; 307/52; 307/147

(58) Field of Classification Search ............... 307/19, 307/52, 29, 62, 147
See application file for complete search history.

(56) References Cited

U.S. PATENT DOCUMENTS

| | | | | |
|---|---|---|---|---|
| 5,406,260 A * | 4/1995 | Cummings et al. | ....... | 340/568.2 |
| 6,218,930 B1 | 4/2001 | Katzenberg et al. | .... | 340/310.01 |
| 6,459,171 B1 * | 10/2002 | Leifer | ........... | 307/52 |
| 6,525,435 B2 * | 2/2003 | Lau et al. | ....... | 307/52 |
| 6,665,404 B2 * | 12/2003 | Cohen | .......... | 379/413 |
| 6,781,809 B2 * | 8/2004 | Milanczak | ................ | 361/104 |
| 6,841,897 B2 * | 1/2005 | Priest | ........... | 307/52 |
| 7,053,501 B1 * | 5/2006 | Barrass | ........... | 307/19 |
| 2002/0101976 A1 * | 8/2002 | Doucette | .......... | 379/231 |
| 2003/0178979 A1 * | 9/2003 | Cohen | ........ | 323/282 |

\* cited by examiner

*Primary Examiner*—Albert W Paladini
*Assistant Examiner*—Hal I Kaplan
(74) *Attorney, Agent, or Firm*—BainwoodHuang

(57) ABSTRACT

Apparatus and method for transmitting over non-adjacent multiple conducting pairs and aggregating powers from the conducting pairs to power remote electronic devices at an end station include, at a line termination (LT), a plurality of power transmitting circuits configured to transmit power over the multiple conducting pairs, and a microcontroller coupled to the plurality of power transmitting circuits and configured to receive a current sense signal from a power receiving circuit at the remote electronic device, and further include, at a network termination (NT), one or more current limiters coupled to multiple conducting pairs and operable to limit the power from the conducting pairs based on power demand information of the end station, and a load controller coupled to the one or more current limiters and configured to selectively activate the one or more current limiters based on a determination by the microcontroller that the end station is allowed to receive a full power demand, the determination being a function of a demand current profile of the end station.

3 Claims, 7 Drawing Sheets

MULTI-PAIR AGGREGATE POWER DISTRIBUTION

CROSS REFERENCE TO RELATED APPLICATIONS

The present application is a continuation of U.S. patent application Ser. No. 10/287,886 filed Nov. 4, 2002 now U.S. Pat. No. 7,053,501 entitled "Multi-Pair Aggregate Power Distribution," all commonly owned herewith.

FIELD OF THE INVENTION

The present invention relates generally to electrical power distribution. More particularly, the present invention relates to methods of and apparatuses for transmitting and aggregating power over multiple conducting pairs to remote devices.

BACKGROUND OF THE INVENTION

For many years conventional telephone handsets have been powered from a central office (CO) or a wiring closet of a private branch exchange (PBX). Power from the CO is supplied over the same twisted pair as is used for voice communication between the CO and the handset. In other words, the power distribution and voice communication medium comprises a single twisted pair within the PSTN (public switched telephone network). Because conventional telephone handsets are powered independent of the electrical power grid, they are able to continue functioning even when power on the electrical power grid is disrupted, for example as may happen due to a power outage.

It would be desirable to extend the advantage of electrical power independency to modem telephonic devices such as, for example, IP (Internet Protocol) telephones or IEEE 802.11 access points. (IEEE is an acronym for Institute of Electrical and Electronics Engineers; 802.11 is a wireless local area network standard set by the IEEE.) However, due to the relatively larger power demands of such devices, regulatory limits on the power that may be transmitted over PSTN twisted pair cabling, and the high resistance of PSTN twisted pairs (which can be up to 1300 $\Omega$ or 250 $\Omega$/km for a given pair), solutions to extend the advantage have not been feasible.

Power over other types of transmission media has been addressed. For example, "Power over LAN (Local Area Network)", known in the industry as the IEEE 802.3af standard, specifies distributing power over Ethernet cabling to remote devices on a LAN. So, in a LAN environment IP telephones may be powered independently of the status of the electrical power grid. Among other specifications of the 802.3af standard, power may be delivered over two adjacent pairs of a Category 5 cable to a remote device by applying a common mode voltage on each pair and using the differential between the pairs to deliver the power. This use of two adjacent pairs permits additional power to be distributed to a remote device that may require more power than can be delivered over a single cable pair.

Because of the problems of transmitting power over the PSTN (public switched telephone network), and to the PSTN, e.g., private branch exchange (PBXs), however, DSL (digital subscriber line) and DSL-like devices are not within the scope of the 802.3af standard. A principle reason for this is that traditional DSL operates over the PSTN and at long distances and, therefore, does not provide an efficient or even feasible means for transmitting power to a remote device. DSL devices typically require more power than a PSTN conducting pair is capable of carrying or is permitted to carry due to regulatory concerns. Indeed, in most instances the PSTN pair used for traditional DSL is not even able to carry the current that would be necessary to power the DSL interface of a DSL device, not to mention the current that would be required to power the remaining technology making up the DSL device.

At the expense of reach for increased data rates, a newer technology referred to as Long-Reach Ethernet or VDSL (Very High Bit Rate DSL) technology uses shorter cabling distances than traditional DSL, e.g., less than about 1.5 km compared to less than about 3.7 km for traditional ADSL (Asynchronous Digital Subscriber Line) technology. Because VDSL uses shorter cabling distances, distributing power over a single twisted pair to a remote DSL device, IP telephone or other remote device, becomes a near possibility. Unfortunately, however, the distances are still too great for most applications, particularly at the maximum reach of VDSL. To increase the power reach, one solution might be to use two adjacent twisted pairs to distribute power, e.g., in a manner analogous to that which may be done to transmit power over Ethernet cabling according to the IEEE 802.3af Power over LAN standard. However this approach is not practicable since adjacent pairs of a DSL system from the wiring closet or CO, i.e., from the line termination (LT) of the system, are arbitrarily routed so that there is no guarantee that they maintain their adjacency at the network termination (NT) of the system.

SUMMARY OF THE INVENTION

The present invention is directed at methods of and apparatuses for transmitting and aggregating power over multiple conducting pairs to remote devices.

According to an aspect of the present invention, a system for providing power to electronic devices comprises a wiring closet having power supplying capabilities for providing power to a plurality of conducting pairs and a remote termination adapted to aggregate power provided to and transmitted by two or more non-adjacent pairs of the plurality of conducting pairs and supply the aggregated power to a remote electronic device.

According to another aspect of the present invention, a system for providing power to electronic devices comprises a wiring closet having a plurality of power circuits configured to transmit power over a plurality of conducting pairs. First and second pairs of the plurality of conducting pairs are routed to a first remote location for providing an aggregated power to a first remote device. The first pair is non-adjacent to the second pair at a line termination (LT) end of the system.

According to yet another aspect of the present invention, a method of providing power to an electronic device comprises coupling an electronic device to first and second conducting pairs, the first and second conducting pairs being non-adjacent conducting pairs provided by a wiring closet or central office, applying power to the first and second conducting pairs, limiting a current drawn through the first and second conducting pairs to a predetermined limited current, sensing the predetermined limited current drawn by the electronic device, determining a current demand of the electronic device, based on the predetermined limited current drawn by the electronic device, and permitting the current demand of the electronic device to increase to a full demand, so long as the current demand does not exceed a maximum current carrying limit of the first and second conducting pairs.

Other aspects of the inventions are described and claimed below, and a further understanding of the nature and advantages of the inventions may be realized by reference to the remaining portions of the specification and the attached drawings.

Figure 1:
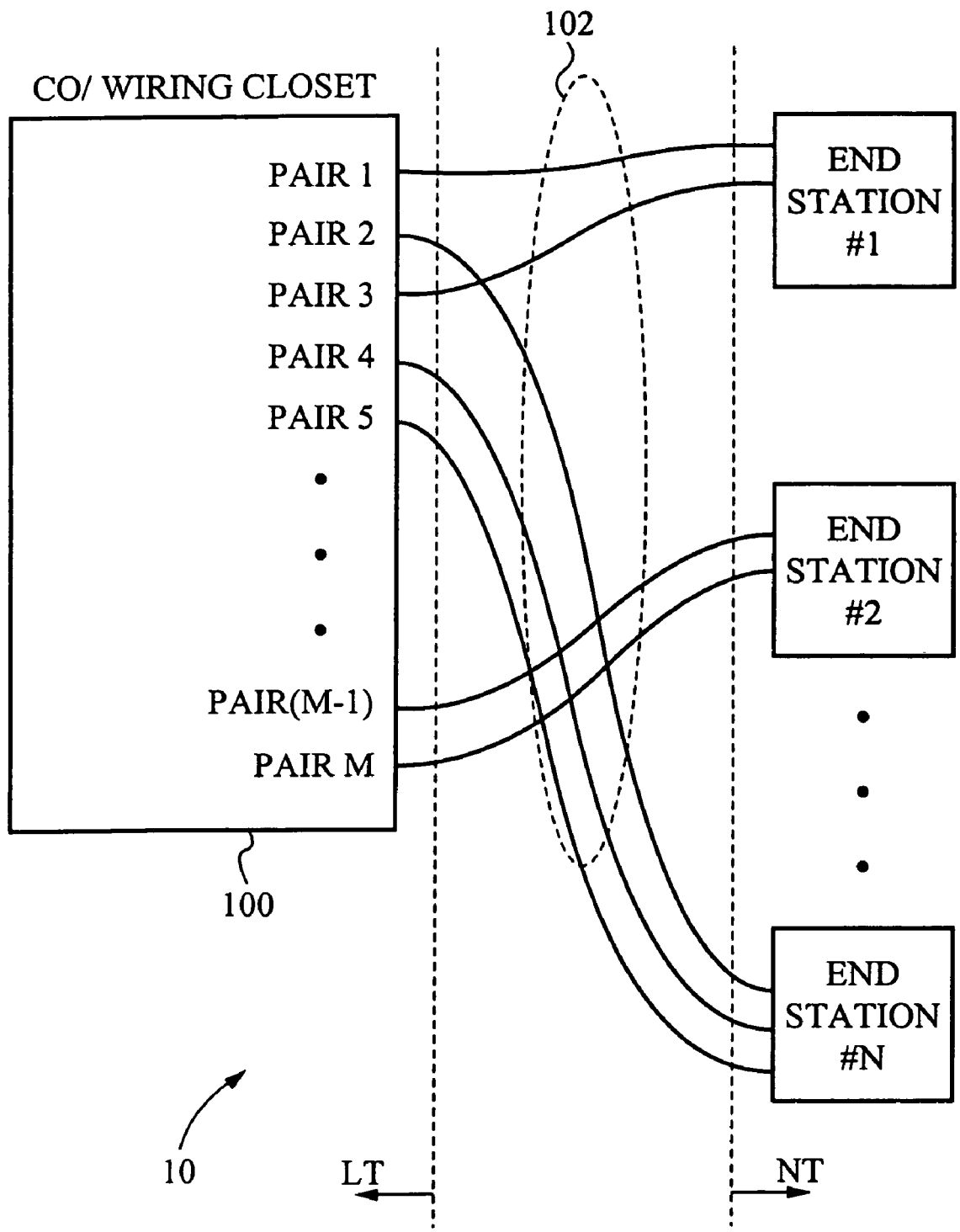
FIG. 1 shows an exemplary power distribution system, according to an embodiment of the present invention.

The disclosure contains, by necessity, simplifications, generalizations and omissions of detail. Consequently, those skilled in the art will appreciate that the disclosure is illustrative only and is not intended in any way to be limiting.

DETAILED DESCRIPTION

Those of ordinary skill in the art will realize that the following detailed description of the present invention is illustrative only and is not intended to be in any way limiting. Other embodiments of the present invention will readily suggest themselves to such skilled persons having the benefit of this disclosure.

Embodiments of the present invention are described herein in the context of methods of and apparatuses for using multiple conducting pairs to transmit power to remote electronic devices. While not expressly shown in the drawings, one skilled in the art will understand that the conducting pairs over which power is transmitted to the various remote devices may also be used to for communicating data and voice information to/from the remote devices. Reference will now be made in detail to implementations of the present invention as illustrated in the accompanying drawings. The same reference indicators will be used throughout the drawings and the following detailed description to refer to the same or like parts.

Referring to FIG. 1, there is shown a power distribution system 10, according to an embodiment of the present invention. A central office (CO) or wiring closet 100 (e.g. of a private branch exchange (PBX)) is located at a line termination (LT) end of system 10. CO/wiring closet 100 provides a plurality of conducting pairs 102, which are identified in FIG. 1 as pair 1, pair 2, pair 3, pair 4, pair 5, pair (M−1) and pair M. Here, M is an integer that is greater than or equal to two. Conducting pairs 102 are arbitrarily configured between the LT and one or more end stations, which are identified in FIG. 1 as end station #1, end station #2, . . . end station #N. Here, N is an integer greater than or equal to one. End stations #1, #2, . . . #N represent either a remote electronic device or a remote location at which an electronic device may be coupled to the conducting pairs.

According to the first alternative, end stations #1, #2, . . . #N might comprise, for example, any combination of IP (Internet Protocol) telephones, wireless access points (e.g. conforming to standards such as IEEE 802.11, Bluetooth, etc.), DSL (Digital Subscriber Line) modems, DSL-like devices, communication repeaters for conditioning data or voice signals, etc. In the last example, a repeater would not technically comprise an "end" station. Rather, such a device would be more accurately identified as an intermediate device coupled between the LT and the NT. Nevertheless, those skilled in the art would readily understand that any one or more of the "end stations #1, #2, . . . #N" may comprise a communication repeater, with the understanding that the conditioned data and/or voice signals are operable to transmit and receive data and/or voice signals to/from a true remote end station not shown in FIG. 1. According to the latter alternative, end stations #1, #2, . . . #N might comprise, for example, hotel rooms of a hotel, different rooms or buildings of a business campus, different residences in a residential service area, etc., within which an electronic device may be coupled to the available conducting pairs. The conducting pairs (i.e. pair 1, pair 2, . . . pair (M−1) and pair M) may comprise shielded or unshielded twisted pair wires of a private branch exchange (PBX) or the public switched telephone network (PSTN), Category 5 cables, or other conducting pair technology.

According to an exemplary embodiment of the present invention, for example where conducting pairs 102 comprise twisted pairs of a PBX or PSTN, conducting pairs 102 are pre-routed, i.e., are permanently and unalterably configured between CO/wiring closet 100 and end stations #1, #2, . . . #N. This is illustrated in FIG. 1, where non-adjacent pair 1 and pair 3 are routed to end station #1, adjacent pairs M and (M−1) are routed to end station #2 and pairs 2, 4, and 5 (pair 4 being adjacent to pair 5 and pair 2 being non-adjacent to pairs 4 and 5) are routed to end station #N. Pairs of other relationships (e.g. number and adjacency or non-adjacency) not shown in FIG. 1 may also be possible. As explained in more detail below, power is distributed over conducting pairs 102, so that the remote devices at the NT may be supplied with power and, therefore, maintain their operation independent and exclusive of the electrical power grid.

Figure 2:
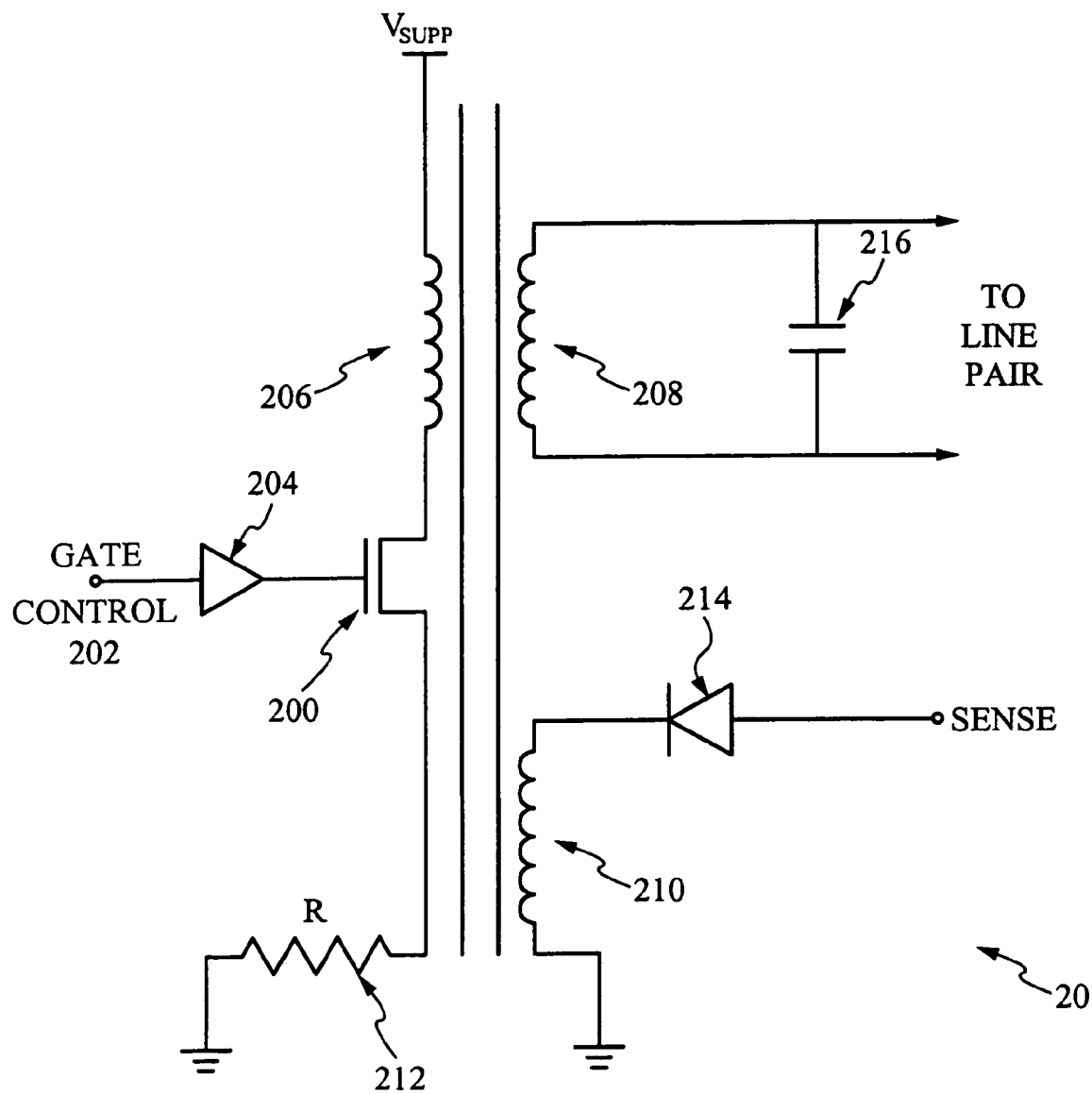
FIG. 2 shows an exemplary power circuit for producing AC power, which may be used to transmit power to a conducting pair in the system shown in FIG. 1, according to an embodiment of the present invention.

At the LT of system 10, each conducting pair of the plurality of conducting pairs 102 is coupled to a power circuit 20, which selectively supplies power to its associated conducting pair. In one embodiment the power may be transmitted as direct current (DC). In another embodiment the power is transmitted as alternating current (AC). FIG. 2 shows an exemplary power circuit 20 for producing AC power, which may be used to transmit power to a conducting pair. Power circuit 20 is configured as a switched mode power supply, which produces an AC pulse train by "chopping" a DC power supply, Vsupp, by the opening and closing of a high power switching transistor 200. The opening and closing of switching transistor 200 is controlled by a gate control signal 202, optionally buffered by a buffer 204. A resistor 212 is shown coupled to the transistor 200 in the embodiment in FIG. 2. The frequency of gate control signal 202 is set to a low enough frequency so that it and the generated AC power do not interfere with data and or voice signals that may be communicated over the same conducting pair. A triple-wound transformer having a primary coil 206, a secondary coil 208 and a current sense coil 210 is wound to provide the desired AC voltage to the conducting line pair. In the embodiment shown in FIG. 2, a capacitor 216 is coupled across the line pair.

Current sense coil 210 mirrors the current and voltage induced through and across secondary coil 208 and, as explained in more detail below, is used to provide a sense line to a power controller to regulate the current and voltage supplied to the pair. In the embodiment shown in FIG. 2, a diode 214 is coupled to the current sense coil 210. It should be emphasized here that power circuit 20 is only one of many AC power generators that can be used to provide AC power to a conducting pair. For example, a power circuit that generates sine waves may alternatively be used for greater efficiency and reduced power loss, but with added complexity and cost. Accordingly, those skilled in the art will readily appreciate that the power circuit shown in FIG. 2 is only exemplary and is but one of many possible power generating and sensing circuits.

Figure 3:
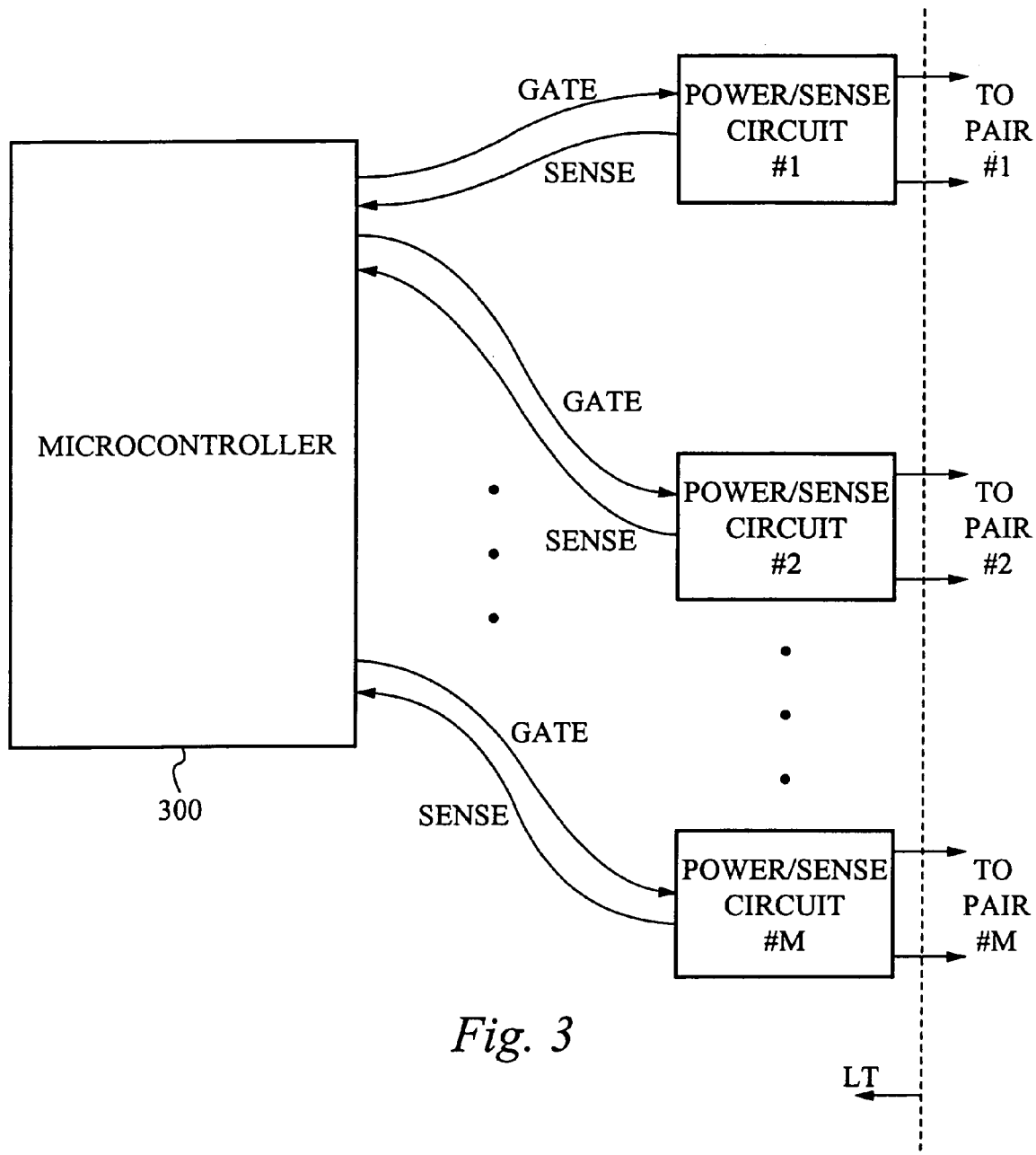
FIG. 3 shows elements of an exemplary power distribution system at the LT end of the system in FIG. 1, according to an embodiment of the present invention.

Referring now to FIG. 3, there is shown an exemplary embodiment of the elements of a power distribution system at the LT end of the system, according to an embodiment of the present invention. A plurality of power/sense circuits, identified in FIG. 3 as power/sense circuit #1, power circuit #2, . . . power circuit #M, are correspondingly coupled to pair #1, pair #2, pair #M. Each power/sense circuit #1, #2, . . . #M may comprise the exemplary power circuit 20 shown in FIG. 2 or similar power/sense circuit. Power/sense circuits #1, #2, . . . #M selectively provide power to their corresponding conducting pairs #1, #2 and #M, as explained in more detail below. Gate control lines, identified in FIG. 3 with the label "gate", are coupled between a microcontroller 300 and power/sense circuits #1, #2, . . . #M. Sense lines, identified in FIG. 3 with the label "sense", are also coupled between microcontroller 300 and power/sense circuits #1, #2, . . . #M. As explained in more detail below, microcontroller 300 uses sense signals from the sense lines to regulate the voltage and current supplied to the conducting pairs. This regulation may be accomplished, at least in part, by microcontroller 300 altering characteristics of gate control signals sent over the gate control lines to the power/sense circuits #1, #2, . . . #M.

Figure 4A:
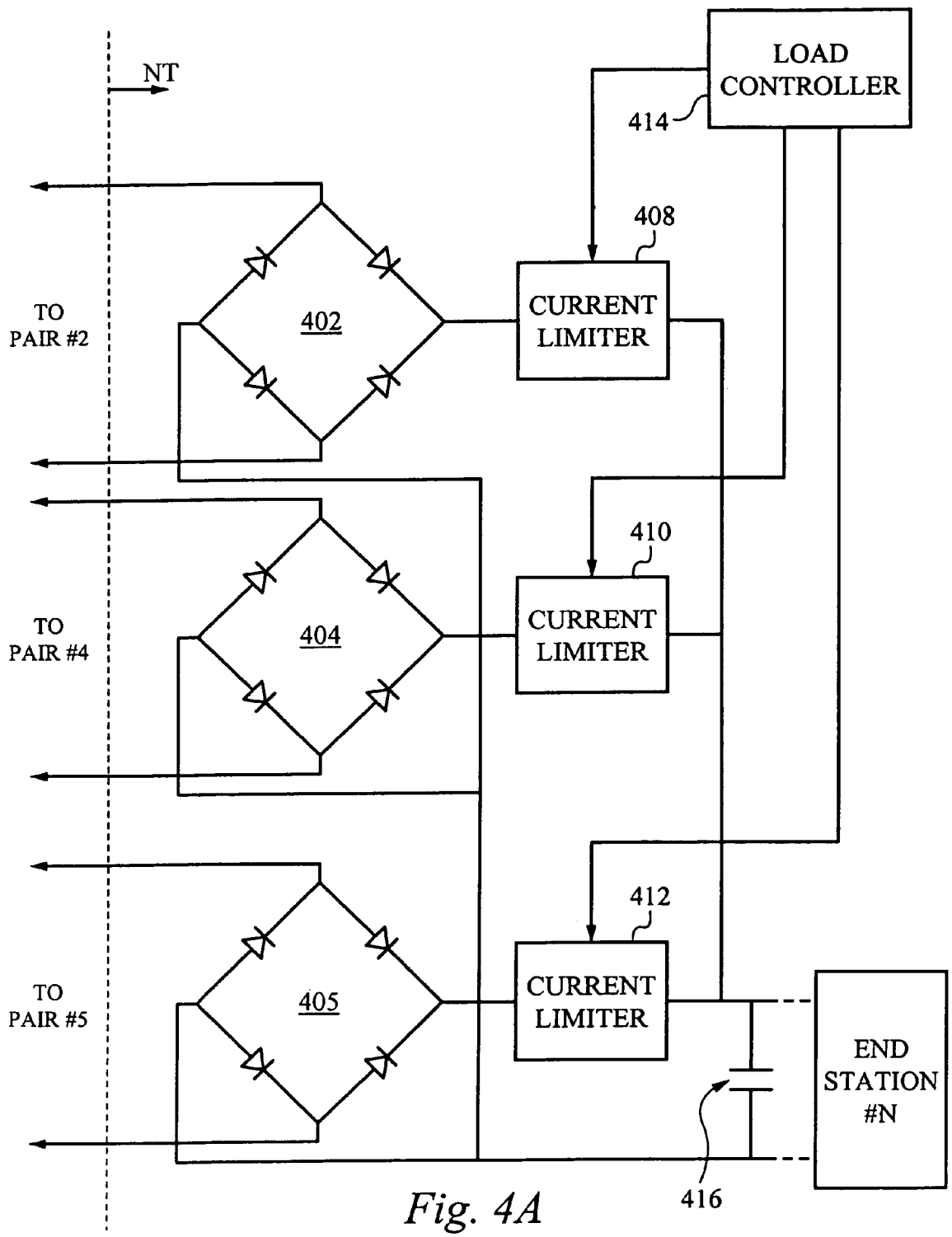
FIG. 4A shows elements of an exemplary power distribution system at the NT end of the system in FIG. 1, according to an embodiment of the present invention.

Referring now to FIG. 4A, there is shown an exemplary embodiment of the elements of a power distribution system at the NT end of the system, according to an embodiment of the present invention. The exemplary embodiment correlates with the exemplary power distribution system 10 shown in FIG. 1 so that end station #N and its associated pairs at the NT in FIG. 4A correspond to end station #N and associated pairs, pair #2, pair #4 and pair #5, at the LT in FIG. 1. FIG. 4A illustrates how the currents transmitted over conducting pairs #2, #4 and pair #5 are aggregated at the NT end to provide an aggregated current to power end station #N. In the embodiment shown in FIG. 4A, a capacitor 416 is coupled across the input into the power end station #N. Power aggregation to other end stations is similar to that shown.

Each of the pairs #2, #4 and #5 are coupled to a corresponding rectifier. Accordingly, rectifiers 402, 404 and 405 in FIG. 4A are coupled to pairs #2, #4 and #5, respectively, and are operable to rectify the AC power received over the pairs. Rectifiers 402, 404 and 405 are coupled to inputs of current limiters 408, 410 and 412, which are individually controlled by a load controller 414 (which may comprise, for example, a microcontroller). As explained in more detail below, load controller 414 limits the current sourced from the power/sense circuits at the LT end and which may be sunk by end station #N, until it is determined that pairs #2, #4 and #5 are capable of transmitting the power needs of end station #N. By controlling the current draw of end station #N as the conducting pairs #2, #4 and #5 are first coupled to the NT, the microcontroller at the LT can determine what the current demand requirements (e.g. what power class of device) are at end station #N.

Figure 4B:
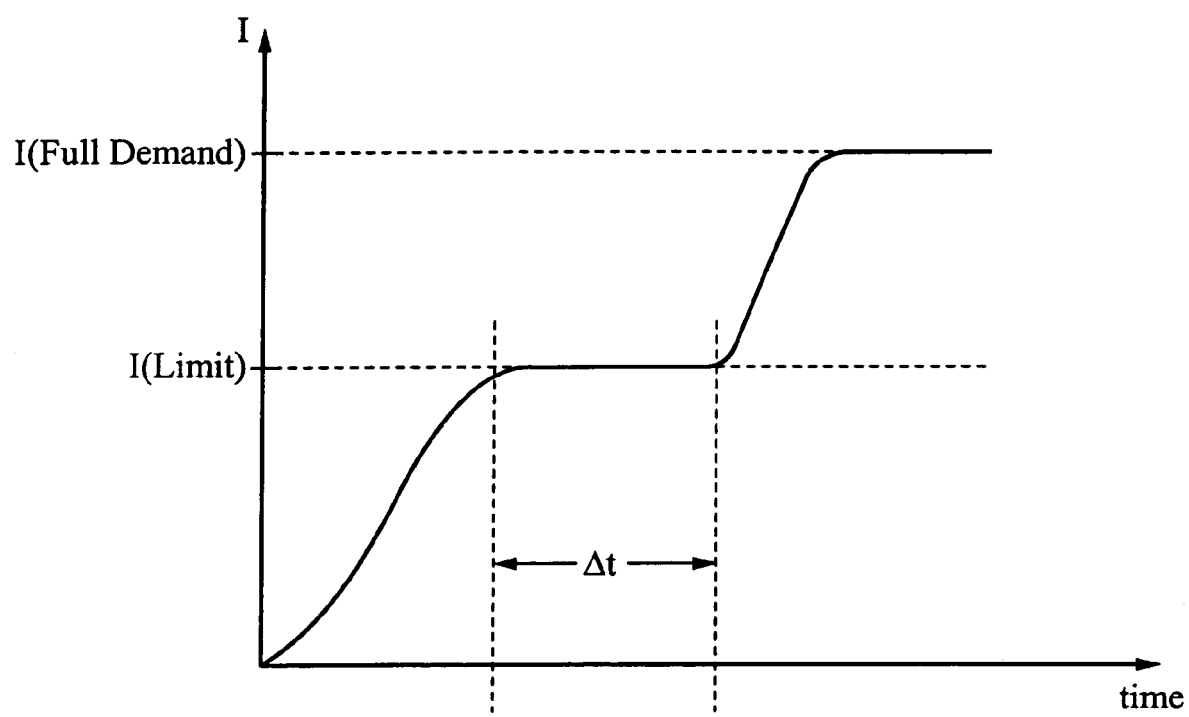
FIG. 4B shows an exemplary current demand profile of an end station in FIG. 4A, according to an embodiment of the present invention.

Referring to FIG. 4B, there is shown an exemplary current demand profile of end station #N in FIG. 4A, once conducting pairs #2, #4 and #5 are coupled to the NT (i.e., once end station #N is coupled to the power distribution system 10). When end station #N is first coupled to power distribution system 10, via pairs #2, #4 and #5, load controller 414 controls line control limiters 408, 410 and 412 so that the aggregated current drawn by end station #N is limited to a predetermined limited current level, I(limit), as shown in FIG. 4B. While limited to I(limit), the sense lines of power/sense circuits #2, #4 and #5 at the LT end signal the current demand profile information of end station #N to microcontroller 300. From the sensed current demand profile, the microcontroller at the LT end determines whether the device is in regulatory compliance and whether power/sense circuits #2, #4 and #5 are able to supply the current demanded by end station #N when operating at full demand. As described in more detail below, the magnitude and/or duration Δt of the predetermined limited current level I(limit) are designed so that the necessary time and current demand information are available for the microcontroller at the LT to perform its screening and regulating functions. With certain exceptions described in detail below, if the microcontroller at the LT determines that end station #N is in regulatory compliance and power/sense circuits #2, #4 and #5 are able to source the maximum current that could be demanded by end station #N, controller 414 switches off current limiters 408, 410 and 412 and allows the device to begin sourcing the current required for full functionality. This current is shown in FIG. 4B as I(full demand). In one embodiment, the microcontroller at the LT regulates power/sense circuits #2, #4 and #5 so that the current draw is distributed evenly among pairs #2, #4 and #5.

Figure 5A:
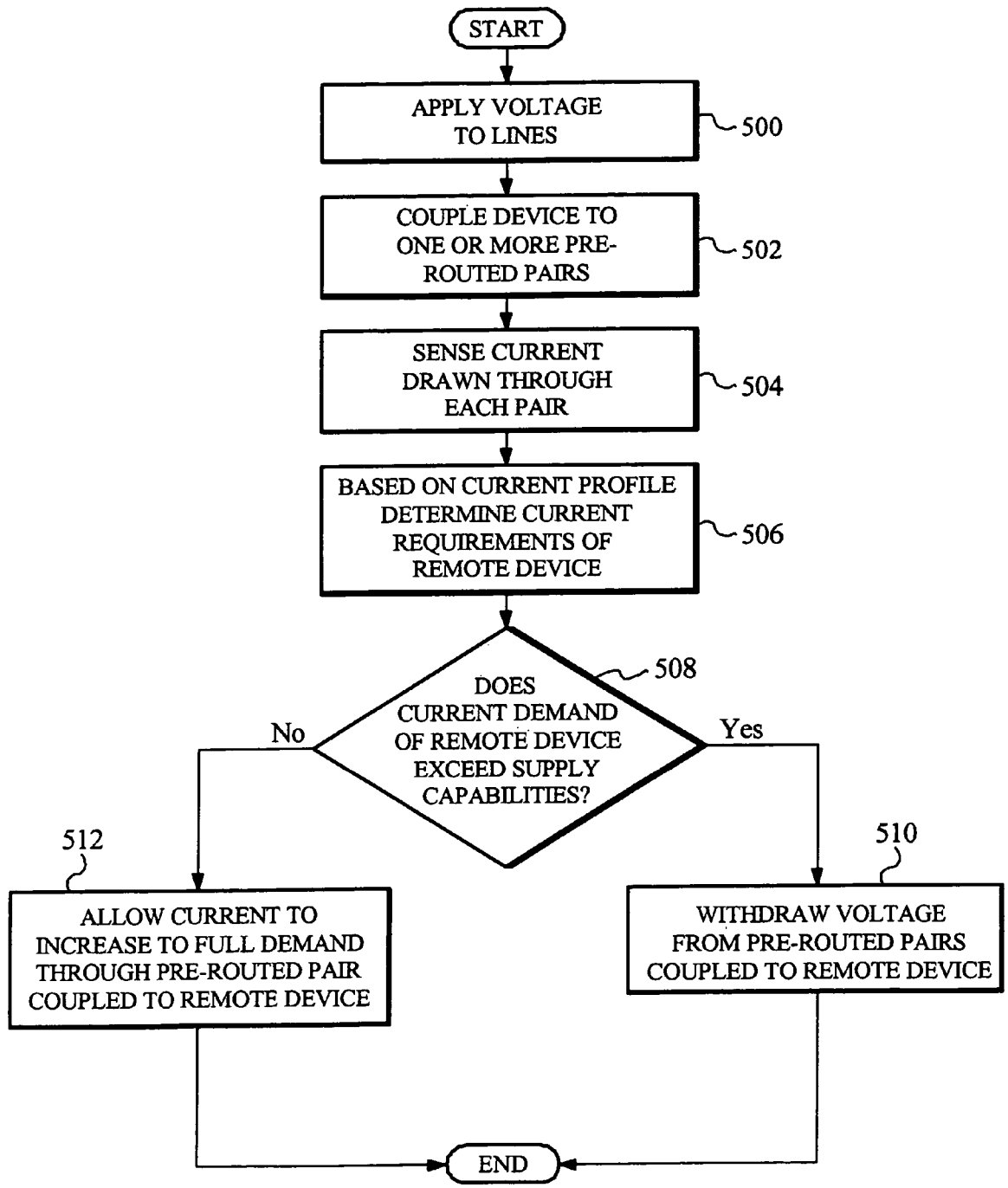
FIG. 5A shows salient steps of an exemplary process for adding a device to a system like that shown in FIG. 1, from the perspective of the LT of the system, according to an embodiment of the present invention.
Figure 5B:
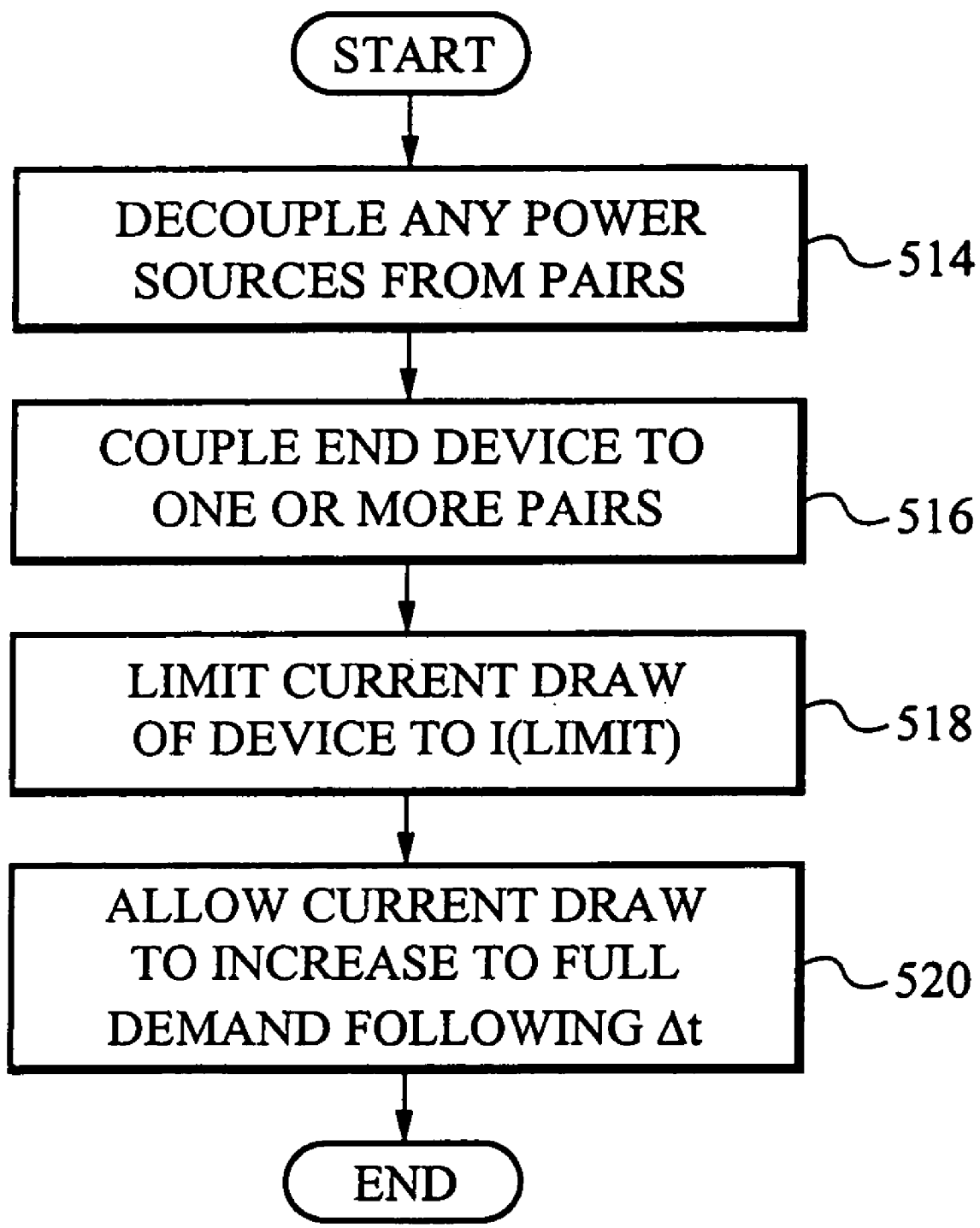
FIG. 5B shows salient steps of an exemplary process for adding a device to a system like that shown in FIG. 1, from the perspective of the NT of the system, according to an embodiment of the present invention.

FIGS. 5A and 5B show an exemplary process of adding an electronic device to the system and selectively providing power to the device over multiple conducting pairs, according to embodiment of the present invention. FIG. 5A shows the salient steps of the process at the LT of the system and FIG. 5B shows the salient steps of the process at the NT of the system. Both are explained below.

Referring first to FIG. 5A, at step 500 a voltage of a predetermined value is applied to multiple conducting pairs at the LT, which have been pre-routed to a remote destination at the NT where an electronic device is to be coupled to the conducting pairs. At step 502 the electronic device is coupled to the multiple conducting pairs. (This step may optionally be performed prior to step 500.) At step 504 current drawn through each pair is sensed in a manner similar to or the same as that described above. As explained below, at this stage in the process the current drawn by the electronic device is limited to a predetermined value. Based on the current profile of the current drawn, at step 506 the microcontroller at the LT determines the current demand requirements of the electronic device.

Next, at step 508 the microcontroller determines whether the power circuits providing power to the conducting pairs are allowed to deliver the required current demand of the end device. This determination depends on the satisfying of four criteria. First, the power/sense circuits themselves must be capable of delivering the maximum current which the device may demand. Second, the multiple conducting pairs must be physically capable of carrying the full current demand of the electronic device. Third, the power transmitted over the conducting pairs must comply with regulatory standards. Finally, addition of the electronic device must not result in the main power supply of the system (i.e. Vsupp) exceeding its current supplying capabilities to all power circuits at the LT. The last requirement results from the power/sense circuits being powered from a main power supply, Vsupp. Vsupp is limited in how much total current the system 10 may provide to remote devices. As devices are added to the power distribution system, microcontroller 300 records the combined load of all configured devices and compares it to a maximum allowable current that may be drawn from Vsupp. If adding a new device would result in the system current exceeding the maximum allowable current that may be supplied by Vsupp, the microcontroller at the LT will not permit power to be distributed over any pairs coupled to the device. If the microcontroller at the LT determines that the all four criteria described above can be satisfied, at step 512 current from the power circuits is permitted to increase to full demand, over the respective conducting pairs and to the remote device. If any of the four criteria is not satisfied, at step 510 all voltages applied to the conducting pairs routed to the device, which is attempting to connect to the system, are withdrawn. Other pairs providing power to other end stations are not affected by this step. It should be emphasized here that the apparatus and criteria used to determine whether to allow current to increase to full demand described above are only exemplary. Other embodiments may use different criteria or may use further criteria such as, for example, temperature as a basis for the decision.

FIG. 5B show the salient steps of the process of adding an electronic device to the system and selectively providing power to the device over multiple conducting pairs, from the perspective of the NT of the system, according to an embodiment of the present invention. At step 514 any power sources applied to the conducting pairs to which the electronic device is to be coupled are decoupled from the pairs. Next, at step 516 (which corresponds to step 502 in FIG. 5A) the device is coupled to the conducting pairs routed to the remote destination at which the device is being coupled to the system. As soon as the device is coupled to the conducting pairs, at step 518 controller 414 limits the current drawn by the device to a predetermined current limit, I(limit), in a manner similar to or the same as that described above. Following a time duration Δt, at step 520 the current limits are removed and the device is allowed to increase its current draw to its full demand. The duration of Δt is set so that it expires after the time it would be required to complete step 504 in FIG. 5A. Accordingly, if at step 508 in FIG. 5A it is determined that the system cannot (or is not permitted to) supply current to the device, power is removed from the conducting pairs at step 514 in FIG. 5A and current is never allowed to increase to full demand at step 520. If, on the other hand, Δt expires without power being removed from the conducting pairs, once controller 414 removes the current limiting condition, current drawn by the device increases according to its demand. It should be emphasized here that the methods described in FIGS. 5A and 5B are but one way of signaling NT power requirements. Accordingly, those skilled in the art will readily understand that other methods and apparatus for sensing and limiting current may be employed without departing from the spirit and scope of the invention.

In addition to the processing steps described in FIGS. 5A and 5B, the microcontroller at the LT of the system monitors and regulates the current supplied over the plurality of conducting pairs 102 at all times to ensure that the max current and voltage are not exceeded. If at any time the current through or voltage across a pair (or pairs) exceeds a regulatory or design limit, power to that pair or pairs is removed.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. A system for providing power from a line termination (LT) to an end station at a network termination (NT), the system comprising:
    a plurality of power transmitting circuits at the LT configured to transmit power over a plurality of conducting pairs;
    a power receiving circuit at the NT configured to receive power from any two or more selected conducting pairs of the plurality of conducting pairs, wherein the power receiving circuit is configured to provide aggregated power from the two or more conducting pairs to the end station;
    a microcontroller at the LT coupled to the plurality of power transmitting circuits, wherein the microcontroller is configured to receive a current sense signal from the power receiving circuit;
    one or more current limiters coupled to the first and second conducting pairs, the one or more current limiters operable to limit the power from the first and second conducting pairs based on power demand information of the end station; and
    a load controller coupled to the one or more current limiters, wherein the load controller selectively activates the one or more current limiters based on a determination by the microcontroller that the end station is allowed to receive a full power demand, said determination being a function of a demand current profile of the end station.

2. The system of claim 1 wherein a first conducting pair and a second conducting pair of the two or more conducting pairs are non-adjacent to one another.

3. The system of claim 1 wherein the power receiving circuit further comprises one or more rectifiers configured to receive AC power transmitted over the first and second conducting pairs and configured to rectify the AC power into direct current (DC) power.

* * * * *